Ellis & Albertson,
Cage Trap.
N° 56,735.        Patented July 31, 1866.
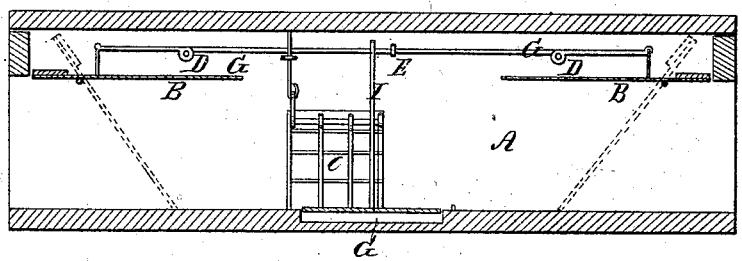
Fig. 2.
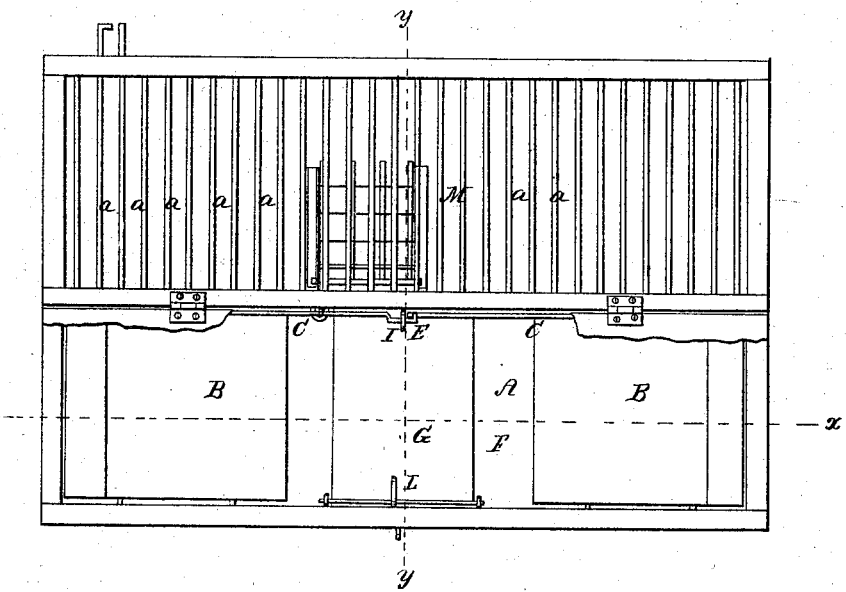
Fig. 1.
Fig. 3.
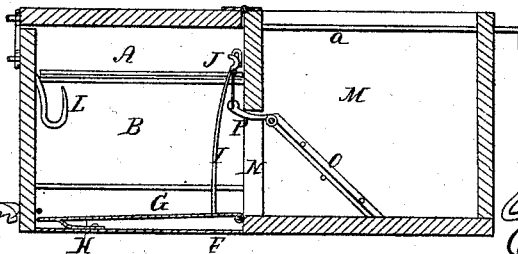
Witnesses:        Inventor;

UNITED STATES PATENT OFFICE.

A. ELLIS AND O. ALBERTSON, OF SALEM, INDIANA.

IMPROVEMENT IN ANIMAL-TRAPS.

Specification forming part of Letters Patent No. 56,735, dated July 31, 1866.

*To all whom it may concern:*

Be it known that we, AUGUSTINE ELLIS and OLIVER ALBERTSON, of Salem, in the county of Washington and State of Indiana, have invented new and useful Improvements in Animal-Traps; and we do hereby declare that the following is a full, clear, and exact description thereof, which will enable others skilled in the art to make and use the same, reference being had to the accompanying drawings, forming part of this specification.

The trap embraced by the present invention consists of a chamber or box open at both of its ends, through which the rats or animals enter the same, any suitable bait being placed in the said chamber for luring or tempting them to enter, when, the moment the animal steps upon and depresses a platform arranged within the floor of the said chamber and flush or even with it, the open ends, by one of which it entered, are instantly closed, the said depression of the platform causing the same through a novel arrangement of connecting devices, thus incasing or shutting up the animal within the box, from which, passing through a wire trap-door, it can escape into another apartment or box independent of the trap-chamber, where it is then caged, the opening of the said trap-door as the animal passes through it reopening the closed ends of the bait box or chamber and resetting them for the entrance of more animals to the box, when, stepping upon the platform of the same, the ends are again closed and then reopened and reset as the animal passes through the trap-door, and so on.

In order to facilitate the passing of the animals from the box in which they are trapped to the box connected with it through the trap-door arranged with regard to and operating the doors of the trap-box, as explained, the trap-box is constructed in such a manner that no light of any consequence can enter it except such as passes through the trap-door of the other box, which box is so constructed as to freely admit light to its interior, while at the same time the animals can under no possibility escape, the importance and advantage of which are obvious.

Having thus in general terms premised the general feature of the present improved animal-trap, we will now proceed to describe the same in detail, reference being had to the accompanying plate of drawings, in which—

Figure 1 is a plan or top view of the trap with the cover of the trap-box removed to show the connection between the end doors of the said box and the trap-door leading from it to the light-box; Fig. 2, a longitudinal vertical section taken in the plane of the line $x x$, Fig. 1; and Fig. 3, a transverse vertical section taken in the plane of the line $y y$, Fig. 1.

Similar letters of reference indicate like parts.

A in the drawings represents one of the boxes or chambers of the trap, open at each end, but having doors B B hung to the sides of the box so as to freely swing thereon, which doors B, through rods C C, one to each door, hung upon fulcrums at D of the sides of the box A, are connected together at E, the joint or connection of the two rods C being such that they can play laterally upon each other.

At or near the central portion of the floor F of the box A is a platform, G, extending across the width of the floor and hung at one end thereto, with its other end free and resting upon a bent spring, H, of the box-floor I, an upright spring-arm secured to the upper side of platform G, the upper end of which arm is bent over, forming a shoulder, J, under which the jointed or linked ends of the rods C are placed, in which position the end doors, B, of the box are swung open and occupy a horizontal position, as shown in Fig. 2. By means of this shoulder J of the arm I the doors B are held open, but immediately close from their own weight when such shoulder is released from the rods, setting them free, by the depression of the platform G, from any weight or pressure brought to bear upon the same.

L is a hook secured to one side of the trap-box, over the free end of its platform G, in which hook it is intended to hang any suitable bait for the entrapping of rats or other animals, the kind of bait used, of course, depending upon the animals which it is desired to entrap; M, a secondary or supplementary box or cage, attached directly to the box A, upon and along its side, which box is closed upon all sides, with its top made open, with a series of parallel wires, $a\ a$, sufficiently close together to prevent the escape of any animal which may be inside of the box. Between this box M and the open-ended box A communication is had through an aperture, N, in the sides of the box, having a wire trap-door, O, hung at its upper end to the side of the box M, so as to swing inward. This door O, through its arm P, is connected with one of the connecting-rods of the two box-doors B, so that if the door be swung open and upward the said rods will be drawn down, and thus made to interlock themselves with the shoulder of the platform-arm J.

In the use of the animal-trap, the detail construction and arrangement of which have been above explained, the cover of the trap-box A is first opened, when the hook is baited with the proper bait, and the connecting-rods C C pressed down and interlocked with the shoulder of the platform-arm I, thus opening the doors to the said box, after which the box-cover is closed and the trap then placed in the most suitable position for catching the animals desired.

As the animal or animals enticed to enter the box by the bait used step upon the platform hung in the bottom or floor of the box A, upon which they are obliged to step in order to reach the bait upon the bait-hook, said platform is thus depressed, and, consequently, the shoulder of its spring-arm released from the connecting-rods of the two doors, which then fall and inclose or encage the animal therein, and prevent its escape therefrom, except through the trap-door opening into the other box, M, by means of which, if the animal then passes through it, the doors of the trap-box are again opened and set in such position, and thereby adjusted for a similar entrapping of another animal, as is obvious without any further explanation.

From the above description it is plain to be seen that when the cage A is open the passage into the same is not in the least obstructed—a quite important feature—and that, furthermore, by having the double-chambered cage, the stench and odor usually imparted to traps when animals are allowed to remain in them for any length of time is entirely obviated—an advantage of considerable importance.

Among the many advantages secured by our improvements in animal-traps, in addition to that above stated, may be here mentioned as the most important that the trap is exceedingly simple in construction, thus securing economy in manufacture; that it is not liable to get out of order, and, by dispensing with all weights and springs, is rendered much more compact in structure and capable of being handled with more ease and safety than the ordinary style of traps, and, besides, can be used in places and situations where with other traps it is impossible.

What we claim as new, and desire to secure by Letters Patent, is—

The arrangement of the connecting-rods C C, platform G, with its spring H, shouldered spring-arm I, trap-door O, and arm P, with the boxes A and M, operating in combination with the swinging-doors B, all constructed substantially in the manner and for the purpose herein specified.

The above specification of our invention signed by us this 2d day of March, 1866.

AUGUSTINE ELLIS.
OLIVER ALBERTSON.

Witnesses:
BENJAMIN F. NICHOLSON,
JOHN B. PITTS.